(12) United States Patent
Zuo

(10) Patent No.: US 9,142,032 B2
(45) Date of Patent: Sep. 22, 2015

(54) METHOD AND APPARATUS FOR IMPLEMENTING MOTION DETECTION

(71) Applicant: Huawei Technologies Co., Ltd., Shenzhen, Guangdong (CN)

(72) Inventor: Kunlong Zuo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 3 days.

(21) Appl. No.: 14/063,816

(22) Filed: Oct. 25, 2013

(65) Prior Publication Data

US 2014/0119602 A1     May 1, 2014

(30) Foreign Application Priority Data

Oct. 26, 2012 (CN) .......................... 2012 1 0417055

(51) Int. Cl.
  *G06K 9/00* (2006.01)
  *G06T 7/20* (2006.01)
  *H04N 5/225* (2006.01)

(52) U.S. Cl.
  CPC ..... *G06T 7/2033* (2013.01); *G06T 2207/10016* (2013.01); *G06T 2207/20216* (2013.01)

(58) Field of Classification Search
  CPC .................................... G06T 7/00; H04N 1/00
  USPC .......... 382/103, 107, 236; 348/154, 155, 169, 348/170, 171, 172, 352
  See application file for complete search history.

(56) References Cited

U.S. PATENT DOCUMENTS

| | | | |
|---|---|---|---|
| 8,243,156 B2 * | 8/2012 | Sako | 348/222.1 |
| 8,311,282 B2 * | 11/2012 | Luo et al. | 382/103 |
| 2007/0136774 A1 | 6/2007 | Lourie et al. | |
| 2008/0211907 A1 | 9/2008 | Kelly et al. | |
| 2010/0008577 A1 | 1/2010 | Steinberg et al. | |
| 2010/0231764 A1 * | 9/2010 | Vakrat et al. | 348/251 |

FOREIGN PATENT DOCUMENTS

| | | | |
|---|---|---|---|
| CN | 101237522 A | 8/2008 | |
| CN | 101355708 A | 1/2009 | |
| CN | 101426081 A | 5/2009 | |
| CN | 101859440 A | 10/2010 | |
| CN | 101860664 A | 10/2010 | |
| EP | 1381225 A2 | 1/2004 | |

* cited by examiner

*Primary Examiner* — Abolfazl Tabatabai
(74) *Attorney, Agent, or Firm* — Leydig, Voit & Mayer, Ltd.

(57) ABSTRACT

A method for motion detection includes: obtaining a pixel value of an image to be detected in a video image sequence, a pixel average value of same positions in a preset number of frame images before the image to be detected, and scene luminance values of the preset number of frame images before the image to be detected; obtaining a pixel scene luminance value and an average scene luminance value by calculation according to the pixel value and the scene luminance values; obtaining P1 according to the pixel value and the pixel average value, and obtaining P2 according to the pixel scene luminance value and the average scene luminance value; and obtaining P3 by integrating the P1 and P2, and detecting, according to the P3, whether the image to be detected includes a motion image region.

16 Claims, 4 Drawing Sheets

METHOD AND APPARATUS FOR IMPLEMENTING MOTION DETECTION

CROSS-REFERENCE TO RELATED APPLICATION

This application claims priority to Chinese Patent Application No. 201210417055.3, filed on Oct. 26, 2012, which is hereby incorporated by reference in its entirety.

TECHNICAL FIELD

The present invention relates to the field of image processing technologies, and in particular, to a method and an apparatus for implementing motion detection.

BACKGROUND

As information technologies are developed constantly and people increasingly pay attention to security issues, video surveillance technologies become more and more popular. Performing motion detection for a video to implement intelligent video surveillance is a widely applied video surveillance method currently. How to perform motion detection for a video to provide a user with a more reliable motion detection result becomes a critical issue in the video surveillance field.

In the prior art, when motion detection is performed for a video, firstly, the format of a video image is converted by an image signal processor, and then, the motion detection is performed for the video by a motion detection apparatus. Input information of the motion detection apparatus is an image pixel value processed by the image processor, and the motion detection apparatus obtains a motion detection result according to the change of the image pixel value. Specifically, the motion detection apparatus determines whether an absolute value of a difference between a current image pixel value and a background pixel value is greater than a threshold. If yes, a motion object exists in a scene; or if not, no motion object exists in a scene.

During the implementation of the present invention, the inventor finds that the prior art has at least the following problems:

When luminance of some regions in the scene changes but luminance of other regions does not change, an automatic adjustment function of the image signal processor causes the image pixel value to change, which further causes the motion detection apparatus to make a wrong judgment when the motion detection apparatus performs the motion detection according to the image pixel value processed by the image processor. Therefore, the motion detection result cannot correctly reflect presence of a motion object in a real scene, and the accuracy of the detection result is not high.

SUMMARY

To solve the problems of the prior art, embodiments of the present invention provide a method and an apparatus for implementing motion detection. The technical solutions are as follows:

In one aspect, a method for implementing motion detection is provided. The method includes:

obtaining a pixel value of a current image to be detected in a video image sequence, a pixel average value of same positions in a preset number of frame images before the image to be detected, and scene luminance values of the preset number of frame images before the image to be detected;

obtaining a pixel luminance value by calculation according to the pixel value, and obtaining an average scene luminance value by calculation according to the scene luminance values of the preset number of frame images before the image to be detected;

obtaining a pixel motion detection value P1 according to the pixel value and the pixel average value, and obtaining a scene luminance motion detection value P2 according to the pixel luminance value and the average scene luminance value; and obtaining an integrated motion detection value P3 by integrating the P1 and P2, and detecting, according to the P3, whether the image to be detected includes a motion image region.

Further, the obtaining a pixel luminance value by calculation according to the pixel value specifically includes:

obtaining the pixel luminance value by calculation according to the pixel value and exposure parameter values;

where, the exposure parameter values at least include a shutter speed of the obtained video image sequence, a gain value, and a reciprocal of an iris value of a lens.

Further, the obtaining a pixel motion detection value P1 according to the pixel value and the pixel average value specifically includes:

obtaining an absolute value of a difference between the pixel value and the pixel average value, and obtaining a first intermediate value according to the absolute value and a preset threshold; and setting the P1 to a value after normalization processing of the first intermediate value, or if the first intermediate value is greater than a preset value, setting the P1 to a first detection value, or if the first intermediate value is smaller than or equal to a preset value, setting the P1 to a second detection value.

Further, the obtaining a scene luminance motion detection value P2 according to the pixel luminance value and the average scene luminance value specifically includes:

obtaining an absolute value of a difference between the pixel luminance value and the average scene luminance value, and obtaining a second intermediate value according to the absolute value and a preset threshold; and setting the P2 to a value after normalization processing of the second intermediate value, or if the second intermediate value is greater than a preset value, setting the P2 to a third detection value, or if the second intermediate value is smaller than or equal to a preset value, setting the P2 to a fourth detection value.

Further, the obtaining an integrated motion detection value P3 by integrating the P1 and P2 specifically includes:

determining an operating mode used when the video image sequence is obtained, and obtaining weights corresponding to the P1 and P2 according to the determined operating mode; and obtaining the P3 according to the weighted P1 and weighted P2 after weighting the P1 and P2 according to the corresponding weights.

Further, the detecting, according to the P3, whether the image to be detected includes a motion image region specifically includes:

determining whether the P3 is greater than a motion detection value; and if the P3 is greater than the motion detection value, determining that the image to be detected includes a motion image region; or if the P3 is smaller than or equal to the motion detection value, determining that the image to be detected does not include a motion image region.

Further, the method is executed before an ISP (Image Signal Processor, image signal processor) performs demosaicing processing on the image to be detected.

Further, the image to be detected is an image obtained after the ISP performs black-level correction, lens shading correction, and pre-denoising processing on the video image sequence.

In another aspect, an apparatus for implementing motion detection is provided. The apparatus includes:

a first obtaining module, configured to obtain a pixel value of a current image to be detected in a video image sequence;

a second obtaining module, configured to obtain a pixel average value of same positions in a preset number of frame images before the image to be detected;

a third obtaining module, configured to obtain scene luminance values of the preset number of frame images before the image to be detected;

a first calculating module, configured to obtain a pixel luminance value by calculation according to the pixel value obtained by the first obtaining module;

a second calculating module, configured to obtain an average scene luminance value by calculation according to the scene luminance values of the preset number of frame images before the image to be detected which are obtained by the third obtaining module;

a fourth obtaining module, configured to obtain a pixel motion detection value P1 according to the pixel value obtained by the first obtaining module and the pixel average value obtained by the second obtaining module;

a fifth obtaining module, configured to obtain a scene luminance motion detection value P2 according to the pixel luminance value obtained by calculation by the first calculating module and the average scene luminance value obtained by calculation by the second calculating module;

an integrating module, configured to obtain an integrated motion detection value P3 by integrating the P1 obtained by the fourth obtaining module and the P2 obtained by the fifth obtaining module; and a detecting module, configured to detect, according to the P3 obtained by integration by the integrating module, whether the image to be detected includes a motion image region.

Further, the first calculating module is specifically configured to obtain the pixel luminance value by calculation according to the pixel value and exposure parameter values;

where, the exposure parameter values at least include a shutter speed of the obtained video image sequence, a gain value, and a reciprocal of an iris value of a lens.

Further, the fourth obtaining module is specifically configured to: obtain an absolute value of a difference between the pixel value and the pixel average value, and obtain a first intermediate value according to the absolute value and a preset threshold; and set the P1 to a value after normalization processing of the first intermediate value, or if the first intermediate value is greater than a preset value, set the P1 to a first detection value, or if the first intermediate value is smaller than or equal to a preset value, set the P1 to a second detection value.

Further, the fifth obtaining module is specifically configured to: obtain an absolute value of a difference between the pixel luminance value and the average scene luminance value, and obtain a second intermediate value according to the absolute value and a preset threshold; and set the P2 to a value after normalization processing of the second intermediate value, or if the second intermediate value is greater than a preset value, set the P2 to a third detection value, or if the second intermediate value is smaller than or equal to a preset value, set the P2 to a fourth detection value.

Further, the integrating module is specifically configured to: determine an operating mode used when the video image sequence is obtained, and obtain weights corresponding to the P1 and P2 according to the determined operating mode; and obtain the P3 according to the weighted P1 and weighted P2 after weighting the P1 and P2 according to the corresponding weights.

Further, the detecting module is specifically configured to: determine whether the P3 is greater than a motion detection value; and if the P3 is greater than the motion detection value, determine that the image to be detected includes a motion image region; or if the P3 is smaller than or equal to the motion detection value, determine that the image to be detected does not include a motion image region.

Further, the apparatus performs a motion detection operation before an ISP performs demosaicing processing on the image to be detected.

Further, the image to be detected which is obtained by the first obtaining module is an image obtained after the ISP performs black-level correction, lens shading correction, and pre-denoising processing on the video image sequence.

The technical solutions provided by the embodiments of the present invention have the following beneficial effects:

Motion detection is performed on an image to be detected in a video by using a pixel value in combination with a scene luminance value, so that when the luminance of some regions changes, the motion detection result is not affected by an overall luminance change of the image. In this way, presence of a motion object in a real scene can be correctly reflected by the motion detection result, and accuracy of the detection result is improved.

BRIEF DESCRIPTION OF DRAWINGS

To describe the technical solutions in the embodiments of the present invention more clearly, the following briefly introduces the accompanying drawing required for describing the embodiments of the present invention. Apparently, the accompanying drawing in the following description show merely some embodiments of the present invention, and persons of ordinary skill in the art may still derive other drawings from the accompanying drawing without creative efforts.

DESCRIPTION OF EMBODIMENTS

To make the objectives, technical solutions, and advantages of the present invention more comprehensible, the embodiments of the present invention are hereinafter described in detail with reference to the accompanying drawings.

Embodiment 1

Figure 1:
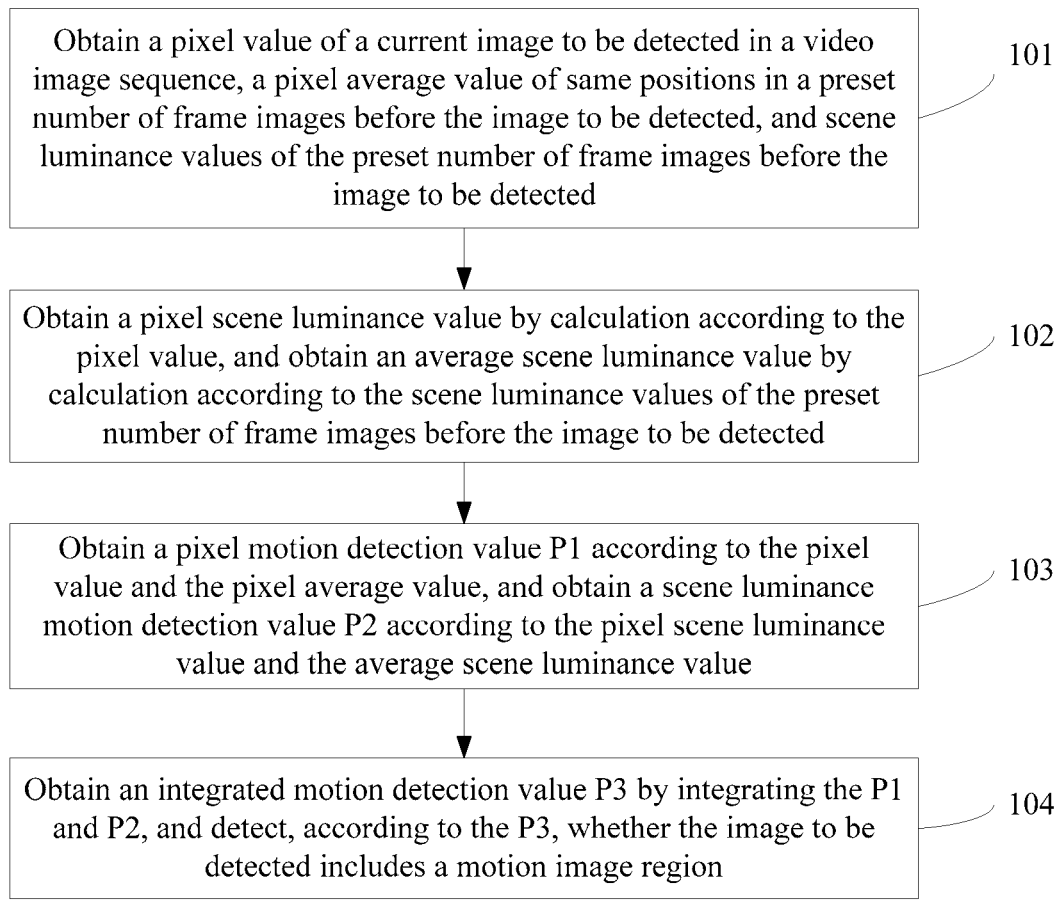
FIG. 1 is a flowchart of a method for implementing motion detection according to Embodiment 1 of the present invention.

An embodiment of the present invention provides a method for implementing motion detection. Referring to FIG. 1, the process of the method includes:

Step 101: Obtain a pixel value of a current image to be detected in a video image sequence, a pixel average value of same positions in a preset number of frame images before the image to be detected, and scene luminance values of the preset number of frame images before the image to be detected.

Step 102: Obtain a pixel luminance value by calculation according to the pixel value, and obtain an average scene luminance value by calculation according to the scene luminance values of the preset number of frame images before the image to be detected.

Further, the obtaining a pixel luminance value by calculation according to the pixel value includes but is not limited to:

obtaining the pixel luminance value by calculation according to the pixel value and exposure parameter values;

where, the exposure parameter values at least include a shutter speed of the obtained video image sequence, a gain value, and a reciprocal of an iris value of a lens.

Step 103: Obtain a pixel motion detection value P1 according to the pixel value and the pixel average value, and obtain a scene luminance motion detection value P2 according to the pixel luminance value and the average scene luminance value.

Further, the obtaining a pixel motion detection value P1 according to the pixel value and the pixel average value includes but is not limited to:

obtaining an absolute value of a difference between the pixel value and the pixel average value, and obtaining a first intermediate value according to the absolute value and a preset threshold; and setting the P1 to a value after normalization processing of the first intermediate value, or if the first intermediate value is greater than a preset value, setting the P1 to a first detection value, or if the first intermediate value is smaller than or equal to a preset value, setting the P1 to a second detection value.

Further, the obtaining a scene luminance motion detection value P2 according to the pixel luminance value and the average scene luminance value specifically includes:

obtaining an absolute value of a difference between the pixel luminance value and the average scene luminance value, and obtaining a second intermediate value according to the absolute value and a preset threshold; and setting the P2 to a value after normalization processing of the second intermediate value, or if the second intermediate value is greater than a preset value, setting the P2 to a third detection value, or if the second intermediate value is smaller than or equal to a preset value, setting the P2 to a fourth detection value.

Step 104: Obtain an integrated motion detection value P3 by integrating the P1 and P2, and detect, according to the P3, whether the image to be detected includes a motion image region.

Further, the obtaining an integrated motion detection value P3 by integrating the P1 and P2 includes but is not limited to:

determining an operating mode used when the video image sequence is obtained, and obtaining weights corresponding to the P1 and P2 according to the determined operating mode; and obtaining the P3 according to the weighted P1 and weighted P2 after weighting the P1 and P2 according to the corresponding weights.

Further, the detecting, according to the P3, whether the image to be detected includes a motion image region specifically includes:

determining whether the P3 is greater than a motion detection value; and if the P3 is greater than the motion detection value, determining that the image to be detected includes a motion image region; or if the P3 is smaller than or equal to the motion detection value, determining that the image to be detected does not include a motion image region.

Further, the method in step 101 to step 104 is executed before an ISP performs demosaicing processing on the image to be detected.

Further, the image to be detected is an image obtained after the ISP performs black-level correction, lens shading correction, and pre-denoising processing on the video image sequence.

With the method provided by this embodiment, motion detection is performed on an image to be detected in a video by using a pixel value in combination with a scene luminance value, so that when the luminance of some regions changes, the motion detection result is not affected by an overall luminance change of the image. In this way, presence of a motion object in a real scene can be correctly reflected by the motion detection result, and accuracy of the detection result is improved. Furthermore, because the motion detection is performed before demosaicing processing, each pixel of the image to be detected in the motion detection has a value of only one color channel, which reduces the calculation load and saves resources.

Embodiment 2

Figure 2:
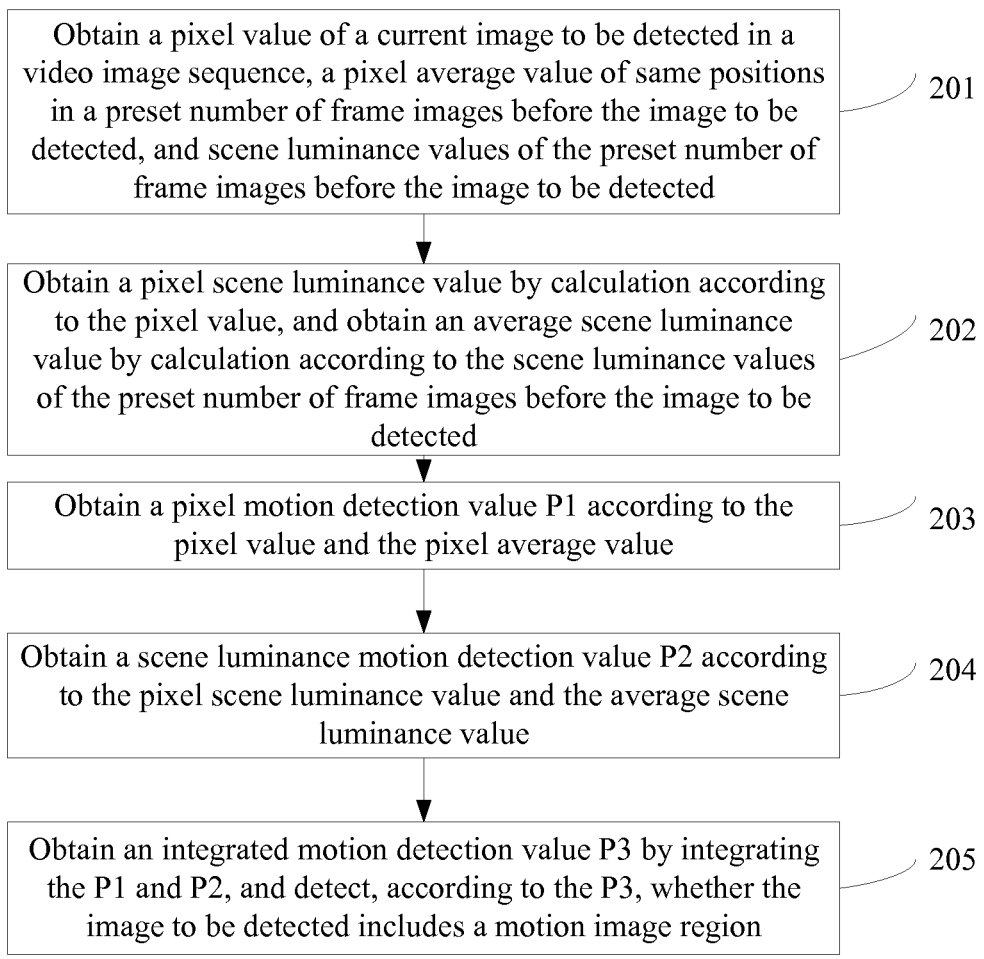
FIG. 2 is a flowchart of a method for implementing motion detection according to Embodiment 2 of the present invention.

An embodiment of the present invention provides a method for implementing motion detection. With reference to Embodiment 1, the following describes in detail the method provided by this embodiment. Referring to FIG. 2, the process of the method provided by this embodiment includes:

Step 201: Obtain a pixel value of a current image to be detected in a video image sequence, a pixel average value of same positions in a preset number of frame images before the image to be detected, and scene luminance values of the preset number of frame images before the image to be detected.

In this step, the image to be detected and the preset number of frame images before the image to be detected are images obtained after an ISP performs black-level correction, lens shading correction, and pre-denoising processing on the video image sequence. In addition to the black-level correction, lens shading correction, and pre-denoising processing for the video image sequence, the ISP may further perform automatic white balancing, demosaicing, contrast enhancement and gamma correction, color correction, color enhancement, color space transformation, denoising and edge enhancement, and other processing on the video image sequence sequentially. The method provided by this embodiment is executed before the ISP performs the demosaicing processing on the video image sequence. The black-level correction is used to correct a black level value of image data; the lens shading correction is used to correct inhomogeneity of image luminance that is caused by lens shading; the pre-denoising is used to perform preliminary denoising on the image; the automatic white balancing is used to add different gains to channels of the image, so that the image is white-balanced; the demosaicing is used to perform color interpolation on each pixel of the image, so that color channels of pixels of the image are complete; the contrast enhancement and gamma correction are used to make the luminance and contrast of the image better; the color correction is used to correct colors of the image; the color enhancement is used to enhance the colors, so that the colors are saturated and more pleasant to eyes; the color space transformation is used to make the image compliant with a color space of an output device; and the denoising and edge enhancement are used to enhance edges of the image and maintain low noise. In the method provided by this embodiment, the image obtained after the ISP performs the black-level correction, lens shading correction, and pre-denoising processing for the video image sequence is used as the image to be detected. Because the demosaicing processing perform color interpolation on each pixel of the image to make the color channels of the pixels of the image complete, when the method provided by this embodiment is executed before the ISP performs the demosaicing processing on the video image sequence, each pixel of the image to be detected has a value of only one color channel, which can reduce the calculation load and further save resources.

Specifically, a manner of obtaining the pixel value of the current image to be detected, the pixel average value of the same positions in the preset number of frame images before the image to be detected, and the scene luminance values of the preset number of frame images before the image to be detected may be an existing manner, which is not specifically limited in this embodiment. The preset number may be set according to specific conditions. For example, the preset number may be 50, that is, in this step, it needs to obtain a pixel average value of same positions in 50 frame images before the current image to be detected, and scene luminance values of the 50 frames before the image to be detected. In addition, the preset number may be other values. The preset number is not specifically limited in this embodiment.

Step 202: Obtain a pixel luminance value by calculation according to the pixel value, and obtain an average scene luminance value by calculation according to the scene luminance values of the preset number of frame images before the image to be detected.

A manner of obtaining the pixel luminance value by calculation according to the pixel value, and obtaining the average scene luminance value by calculation according to the scene luminance values of the preset number of frame images before the image to be detected is not specifically limited in this embodiment. In specific implementation, a relationship between the pixel value and the scene luminance value may be as shown in formula (1), and then the pixel value and the pixel luminance value meet the relationship shown in formula (1). Therefore, after the pixel value of the current image to be detected is obtained in step 201, the pixel luminance value may be obtained by calculation according to the following formula:

$$L=I/(Shutter\_speed*ISO\_gain*Iris\_v) \quad (1)$$

In the formula, Shutter_speed indicates a shutter speed; ISO_gain indicates a gain value, where the gain value is equal to a product of a digital gain and an analog gain; and Iris_v indicates a reciprocal of an iris value of a lens. Shutter_speed, ISO_gain, and Iris_v are exposure parameters used by an automatic exposure algorithm to adjust image luminance. The exposure parameter values may be set according to actual conditions. The specific exposure parameter values are not limited in this embodiment. In the formula, I indicates a pixel value. If the pixel value of the current image to be detected, which is obtained in step 201, is substituted as I into the formula, L obtained by calculation is the pixel luminance value.

Further, when the average scene luminance value is obtained by calculation according to the scene luminance values of the preset number of frames before the image to be detected, a specific calculation process may be implemented, which is not specifically limited in this embodiment. For example, if scene luminance values of 5 frames before the image to be detected are obtained, a sum of the scene luminance values of the 5 frames may be obtained, and the sum divided by 5 is the average scene luminance value.

Step 203: Obtain a pixel motion detection value P1 according to the pixel value and the pixel average value.

Specifically, a manner of obtaining the pixel motion detection value P1 according to the pixel value and the pixel average value after the pixel value and the pixel average value are obtained in step 201 includes but is not limited to:

obtaining an absolute value of a difference between the pixel value and the pixel average value, and obtaining a first intermediate value according to the absolute value and a preset threshold; and setting the P1 to a value after normalization processing of the first intermediate value, or if the first intermediate value is greater than a preset value, setting the P1 to a first detection value, or if the first intermediate value is smaller than or equal to a preset value, setting the P1 to a second detection value.

The pixel motion detection value P1 may be obtained by using a background subtraction method. For ease of description, this embodiment is described through an example where a symbol X1 is used to identify the absolute value of the difference between the pixel value and the pixel average value, that is, X1 is used to identify a result obtained through the background subtraction, a symbol T is used to identify the preset threshold, and a symbol Y1 is used to identify the first intermediate value, where, X1=80, T=50, the preset value is 0.5, the first detection value is 1, and the second detection value is 0. According to that the absolute value X1=80 and the preset threshold T=50, the first intermediate value Y1=0.8 may be calculated by using a formula X1/(2*T). Because the first intermediate value Y1 is greater than 0.5, the pixel motion detection value P1 is equal to 1.

Of course, a manner of obtaining the pixel motion detection value P1 may be any other motion detection method than the background subtraction method, which is not specifically limited in this embodiment. The absolute value, preset threshold, preset value, first detection value, and second detection value may be other values than the preceding values, which are not specifically limited in this embodiment.

Step 204: Obtain a scene luminance motion detection value P2 according to the pixel luminance value and the average scene luminance value.

In this step, a manner of obtaining the scene luminance motion detection value P2 according to the pixel luminance value and the average scene luminance value after the pixel luminance value and the average scene luminance value are obtained by calculation in step 202 includes but is not limited to:

obtaining an absolute value of a difference between the pixel luminance value and the average scene luminance value, and obtaining a second intermediate value according to the absolute value and a preset threshold; and setting the P2 to a value after normalization processing of the second intermediate value, or if the second intermediate value is greater than a preset value, setting the P2 to a third detection value, or if the second intermediate value is smaller than or equal to a preset value, setting the P2 to a fourth detection value.

The scene luminance motion detection value P2 may be obtained by using the background subtraction method. For ease of description, this embodiment is described through an example where a symbol X2 is used to identify the absolute value of the difference between the pixel luminance value and the average scene luminance value, that is, X2 is used to identify a result obtained through the background subtraction, a symbol T is used to identify the preset threshold, and a symbol Y2 is used to identify the second intermediate value, where, X2=200, T=50, the preset value is 0.5, the third detection value is 0.8, and the fourth detection value is 0.2. According to that the absolute value X2=200 and the preset threshold T=50, the second intermediate value Y2=2 may be calculated by using the formula X2/2T. Because the second intermediate value Y2 is greater than 0.5, the scene luminance motion detection value P2 is equal to 0.8.

Of course, a manner of obtaining the scene luminance motion detection value P2 may be any other motion detection method than the background subtraction method, which is not specifically limited in this embodiment. The absolute value, preset threshold, preset value, third detection value, and fourth detection value may be other values than the preceding values, which are not specifically limited in this embodiment. In addition, the first detection value in step 203 may or may not be equal to the third detection value, and the second detection value in step 203 may or may not be equal to the fourth detection value, which is not specifically limited in this embodiment.

Step 205: Obtain an integrated motion detection value P3 by integrating the P1 and P2, and detect, according to the P3, whether the image to be detected includes a motion image region.

In this step, when the P1 and P2 are integrated to obtain the integrated motion detection value P3, a sum of the P1 and P2 may be obtained and used as the P3. In addition, to improve detection accuracy of the detection result, the P1 and P2 may be respectively weighted according to an operating mode of a device that obtains the image, and the P3 is obtained according to the weighted P1 and weighted P2. A manner of obtaining the P3 by weighting the P1 and P2 includes but is not limited to:

determining an operating mode used when the video image sequence is obtained, and obtaining weights corresponding to the P1 and P2 according to the determined operating mode; and obtaining the P3 according to the weighted P1 and weighted P2 after weighting the P1 and P2 according to the corresponding weights.

The operating mode used when the video image sequence is obtained includes but is not limited to an indoor mode, an outdoor mode, and a common mode. According to a manner of determining the operating mode, a corresponding operating mode may be set according to different scene, as detailed below:

(1) In an indoor environment, the operating mode is set to an indoor mode.

(2) In an outdoor environment, the operating mode is set to an outdoor mode. In this mode, because a great change of scene luminance is caused by the difference of lighting between daytime and nighttime, it needs to consider that the range of scene luminance in the outdoor mode is changed according to time.

(3) When it is impossible to determine a scene, the operating mode is set to a common mode.

In different operating modes, different normalization ranges of scene luminance need to be set. When the normalization range of scene luminance is obtained, normalization processing may be performed on the scene luminance according to a calibrated value of an image pixel value and corresponding exposure parameter values by using the relationship between the pixel value and the scene luminance value shown in formula (1) in step 202. The specific manner is as follows:

Firstly, the scene luminance is calibrated, and the following calibrated values are obtained:

(1) The image pixel value I is set to half of an allowed maximum value of the pixel value, and the luminance of a shot scene is increased continuously. When exposure reaches a maximum value, maximum exposure parameter values, that is, an allowed maximum value of exposure shutter time, allowed maximum value of the gain, and allowed maximum value of the iris, are obtained, and L_min is obtained according to formula (1), where, the L_min is equivalent to a minimum luminance value that can be obtained.

(2) The image pixel value I is set to half of an allowed maximum value of the pixel value, and the luminance of a shot scene is reduced continuously. When exposure reaches a minimum value, minimum exposure parameter values, that is, an allowed minimum value of exposure shutter time, gain being 1, and an allowed minimum value of the iris, are obtained, and L_max is obtained according to formula (1), where, the L_max is equivalent to a maximum luminance value that can be obtained.

(3) When the scene luminance is at a critical point between indoor luminance and outdoor luminance, a full-white scene is shot. A corresponding scene average pixel value is I, and L_mid is obtained according to corresponding exposure parameter values by using formula (1), where, the L_mid is equivalent to a luminance value at the critical point that can be obtained. In addition, the luminance value at the critical point may be determined according to experience. For example, the luminance value at the critical point is set to 2000 luxes or other values according to experience. The specific luminance value at the critical point and a determining manner are not limited in this embodiment.

In addition to the preceding manner of determining the normalization range of scene luminance, the normalization range of scene luminance may be specified by a user according to an actual scene luminance condition; or the scene luminance may be classified into different levels, and corresponding to different levels, different normalization ranges of scene luminance may be set; or the normalization range of scene luminance is determined in other manners. A specific manner of determining the normalization range of scene luminance is not limited in this embodiment.

After the normalization range of scene luminance is determined in the preceding process, when different normalization ranges of scene luminance are set in different operating modes, for the indoor mode, the normalization range of scene luminance is set to [L_min, L_mid]; for the outdoor operating mode, the normalization range of scene luminance at daytime is set to [L_mid, L_max], and the normalization range of scene luminance at nighttime is set to [L_min, L_mid]; and for the common mode, the normalization range of scene luminance is set to [L_min, L_max].

After the operating mode is determined and different normalization ranges of scene luminance are set in the preceding process, the normalization range of scene luminance that the pixel luminance value obtained in step 202 falls within may be queried, and then a corresponding operating mode may be queried according to the queried normalization range of scene luminance, and the queried operating mode is used as the operating mode used when the video image sequence is obtained.

Further, after the operating mode is determined in the preceding process, the weights corresponding to the P1 and P2 are obtained according to the determined operating mode.

For ease of description, this embodiment is described through an example where the weight corresponding to the P1 is W1 and the weight corresponding to the P2 is W2. In the indoor mode, the weight W1 may be set to 0.7, and the weight W2 may be set to 0.3; in the outdoor mode, the weight W1 may be set to 0.5, and the weight W2 may be set to 0.5; and in the common mode, the weight W1 may be set to 0.3, and the weight W2 may be set to 0.7.

In different operating modes, values of the weight W1 and weight W2 may be set according to specific conditions. The values of the weights are not specifically limited in this embodiment.

Further, after the weights corresponding to the P1 and P2 are obtained, the P1 and P2 may be weighted according to the corresponding weights; then the P3 is obtained according to the weighted P1 and weighted P2, for example, the P3 is obtained according to a relational expression P3=W1*P1+W2*P2; and finally, whether the image to be detected includes a motion image region is detected according to the P3.

The detecting, according to the P3, whether the image to be detected includes a motion image region includes but is not limited to:

determining whether the P3 is greater than a motion detection value; and if the P3 is greater than the motion detection value, determining that the image to be detected includes a motion image region; or if the P3 is smaller than or equal to the motion detection value, determining that the image to be detected does not include a motion image region.

For example, the pixel motion detection value P1 obtained in step 203 is 1; the scene luminance motion detection value P2 obtained in step 204 is 0.8; the determined operating mode used when the video image sequence is obtained is the indoor mode; the corresponding W1 is 0.7; the corresponding W2 is 0.3; and the motion detection value is 0.5. In this case, the integrated motion detection value is P3=0.7*1+0.3*0.8=0.94>0.5. Therefore, the image to be detected includes a motion image region.

The value of the motion detection value may also be other values. The value of the motion detection value is not specifically limited in this embodiment.

With the method provided by this embodiment, motion detection is performed on an image to be detected in a video by using a pixel value in combination with a scene luminance value, so that when the luminance of some regions changes, the motion detection result is not affected by an overall luminance change of the image. In this way, presence of a motion object in a real scene can be correctly reflected by the motion detection result, and accuracy of the detection result is improved. Furthermore, because the motion detection is performed before demosaicing processing, each pixel of the image to be detected in the motion detection has a value of only one color channel, which reduces the calculation load, and saves resources.

Embodiment 3

Figure 3:
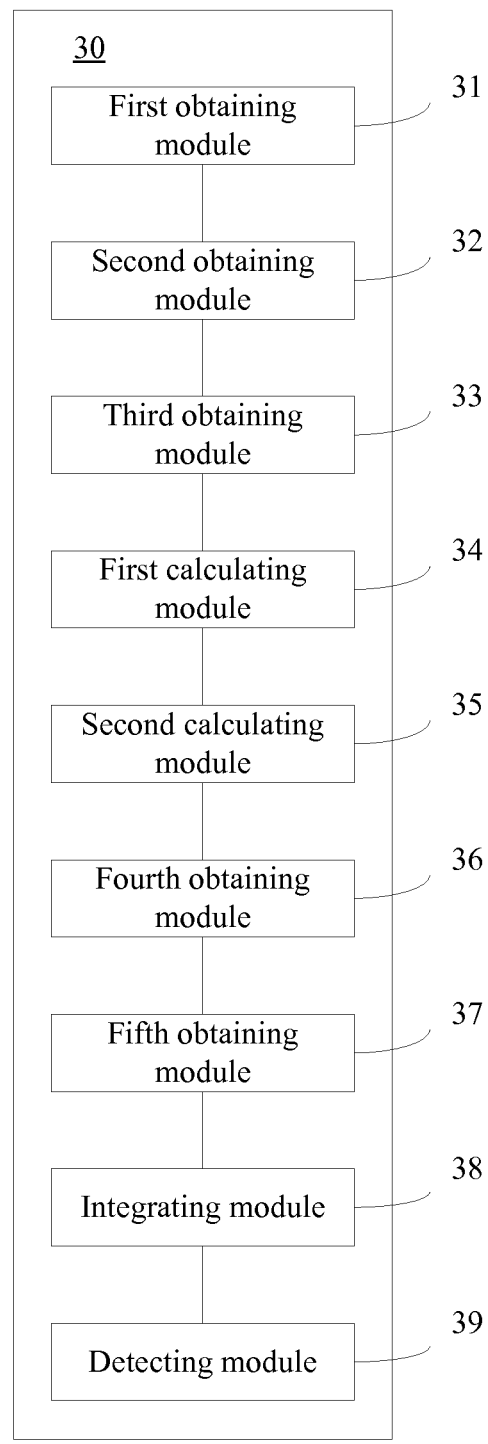
FIG. 3 is a schematic structural diagram of an apparatus for implementing motion detection according to Embodiment 3 of the present invention.

This embodiment provides an apparatus for implementing motion detection. The apparatus is configured to execute the method for implementing motion detection according to Embodiment 1 or Embodiment 2. Referring to FIG. 3, the apparatus 30 includes:

a first obtaining module 31, configured to obtain a pixel value of a current image to be detected in a video image sequence;

a second obtaining module 32, configured to obtain a pixel average value of same positions in a preset number of frame images before the image to be detected;

a third obtaining module 33, configured to obtain scene luminance values of the preset number of frame images before the image to be detected;

a first calculating module 34, configured to obtain a pixel luminance value by calculation according to the pixel value obtained by the first obtaining module 31;

a second calculating module 35, configured to obtain an average scene luminance value by calculation according to the scene luminance values of the preset number of frame images before the image to be detected which are obtained by the third obtaining module 33;

a fourth obtaining module 36, configured to obtain a pixel motion detection value P1 according to the pixel value obtained by the first obtaining module 31 and the pixel average value obtained by the second obtaining module 32;

a fifth obtaining module 37, configured to obtain a scene luminance motion detection value P2 according to the pixel luminance value obtained by calculation by the first calculating module 34 and the average scene luminance value obtained by calculation by the second calculating module 35;

an integrating module 38, configured to obtain an integrated motion detection value P3 by integrating the P1 obtained by the fourth obtaining module 36 and the P2 obtained by the fifth obtaining module 37; and a detecting module 39, configured to detect, according to the P3 obtained by integration by the integrating module 38, whether the image to be detected includes a motion image region.

Further, the first calculating module 34 is specifically configured to obtain the pixel luminance value by calculation according to the pixel value and exposure parameter values;

where, the exposure parameter values at least include a shutter speed of the obtained video image sequence, a gain value, and a reciprocal of an iris value of a lens.

Further, the fourth obtaining module 36 is specifically configured to: obtain an absolute value of a difference between the pixel value and the pixel average value, and obtain a first intermediate value according to the absolute value and a preset threshold; and set the P1 to a value after normalization processing of the first intermediate value, or if the first intermediate value is greater than a preset value, set the P1 to a first detection value, or if the first intermediate value is smaller than or equal to a preset value, set the P1 to a second detection value.

Further, the fifth obtaining module 37 is specifically configured to: obtain an absolute value of a difference between the pixel luminance value and the average scene luminance value, and obtain a second intermediate value according to the absolute value and a preset threshold; and set the P2 to a value after normalization processing of the second intermediate value, or if the second intermediate value is greater than a preset value, set the P2 to a third detection value, or if the second intermediate value is smaller than or equal to a preset value, set the P2 to a fourth detection value.

Further, the integrating module 38 is specifically configured to: determine an operating mode used when the video image sequence is obtained, and obtain weights corresponding to the P1 and P2 according to the determined operating mode; and obtain the P3 according to the weighted P1 and weighted P2 after weighting the P1 and P2 according to the corresponding weights.

Further, the detecting module 39 is specifically configured to: determine whether the P3 is greater than a motion detection value; and if the P3 is greater than the motion detection value, determine that the image to be detected includes a motion image region; or if the P3 is smaller than or equal to the motion detection value, determine that the image to be detected does not include a motion image region.

Further, the apparatus performs a motion detection operation before an ISP performs demosaicing processing for the image to be detected.

Further, the image to be detected which is obtained by the first obtaining module 31 is an image obtained after the ISP performs black-level correction, lens shading correction, and pre-denoising processing on the video image sequence.

In conclusion, with the apparatus provided by the embodiment of the present invention, motion detection is performed on an image to be detected in a video by using a pixel value in combination with a scene luminance value, so that when the luminance of some regions changes, the motion detection result is not affected by an overall luminance change of the image. In this way, presence of a motion object in a real scene can be correctly reflected by the motion detection result, and accuracy of the detection result is improved. Furthermore, because the motion detection is performed before demosaicing processing, each pixel of the image to be detected in the motion detection has a value of only one color channel, which reduces the calculation load, and saves resources.

Embodiment 4

Figure 4:
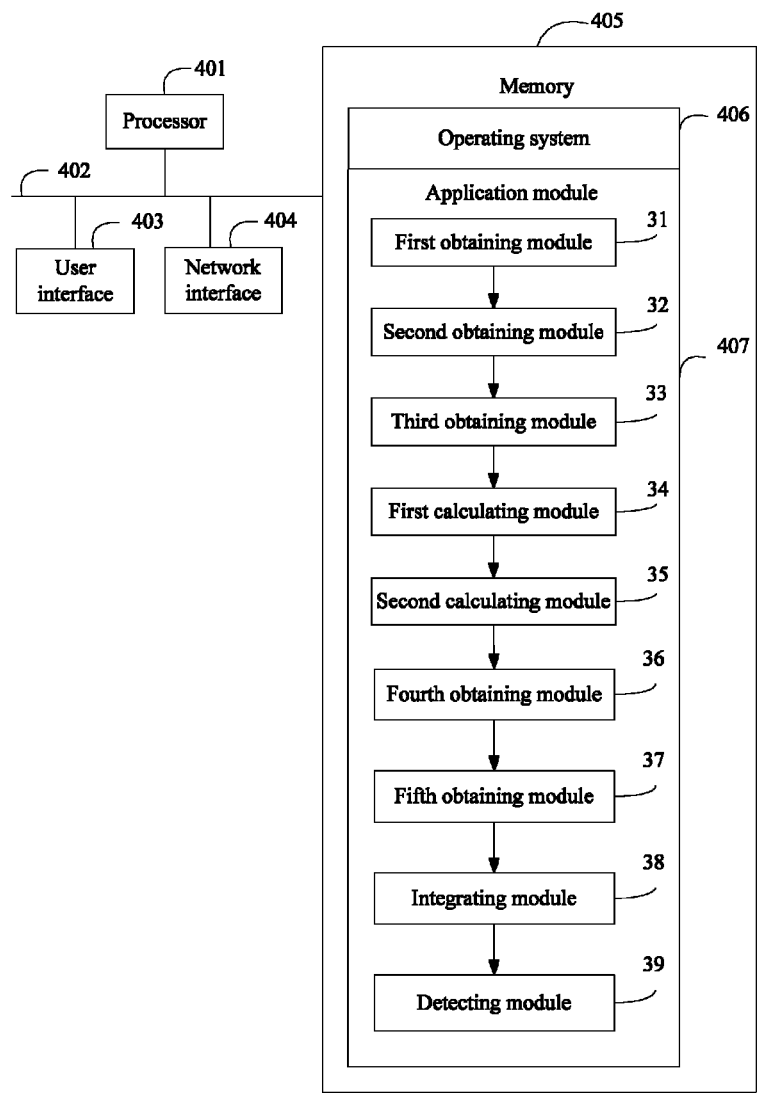
FIG. 4 is a schematic structural diagram of an apparatus for implementing motion detection according to Embodiment 4 of the present invention.

FIG. 4 is a schematic structural diagram of an apparatus for implementing motion detection according to an embodiment. The apparatus for implementing motion detection includes at least one processor (401), such as a CPU, at least one network interface 404 or a user interface 403, a memory 405, at least one communication bus 402, an operating system 406, and an application module 407. The communication bus 402 is configured to implement connection and communication between these modules of the apparatuses. The user interface 403 may be an interface for connecting a display, a keyboard, or a mouse. The memory 405 may include a high-speed RAM, and may further include a non-volatile memory (non-volatile memory), for example, at least one disk memory. The memory 405 may optionally include at least one storage apparatus far away from the CPU 401. In some embodiments, the memory 405 stores the following elements: modules or data structures, or subsets thereof, or extended sets thereof The operating system 406 includes various programs configured to implement various basic services and process hardware-based tasks.

The application module 407 includes a first obtaining module 31, a second obtaining module 32, a third obtaining module 33, a first calculating module 34, a second calculating module 35, a fourth obtaining module 36, a fifth obtaining module 37, an integrating module 38, and a detecting module 39. For the functions of the preceding modules, reference may be made to the description of the schematic operating diagram of FIG. 3, which are not further described herein.

With the apparatus provided by this embodiment, motion detection is performed on an image to be detected in a video by using a pixel value in combination with a scene luminance value, so that when the luminance of some regions changes, the motion detection result is not affected by an overall luminance change of the image. In this way, presence of a motion object in a real scene can be correctly reflected by the motion detection result, and accuracy of the detection result is improved. Furthermore, because the motion detection is performed before demosaicing processing, each pixel of the image to be detected in the motion detection has a value of only one color channel, which reduces the calculation load, and saves resources.

It should be noted that, when the apparatus for implementing motion detection that is provided by the above embodiment implements the motion detection, only division of the above functional modules is used as an example for description. In actual applications, the above functions may be completed by different functional modules according to requirements, that is, the internal structure of the apparatus is divided into different functional modules for completing all or part of the functions described above. In addition, the apparatus for implementing motion detection according to the above embodiment and the method embodiment for implementing motion detection are based on the same conception. The specific implementation process is described in the method embodiment and is not further described herein.

The sequence numbers of the preceding embodiments of the present invention are merely for the description purpose but do not indicate the preference of the embodiments.

It is understandable to persons of ordinary skill in the art that, all or part of the steps in the embodiments may be performed by hardware or by a program instructing relevant hardware. The program may be stored in a computer readable storage medium. The storage medium may be a read only memory, a magnetic disk, an optical disk, or the like.

The above descriptions are merely exemplary embodiments of the present invention, but not intended to limit the present invention. Any modification, equivalent replacement, improvement, and so on made within the spirit and principle of the present invention shall fall within the protection scope of the present invention.

What is claimed is:

1. A method for motion detection, the method comprising:
obtaining a pixel value at a position of a current image in a video image sequence, a pixel average value in a preset number of frame images before the current image corresponding to same position as the pixel value of the current image, and scene luminance values of the preset number of the frame images before the current image;
calculating a pixel luminance value based on the pixel value, and calculating an average scene luminance value based on the scene luminance values;
obtaining a pixel motion detection value (P1) based on the pixel value and the pixel average value, and obtaining a luminance motion detection value (P2) based on the pixel luminance value and the average scene luminance value; and
obtaining an integrated motion detection value (P3) by integrating P1 and P2, and determining, based on P3, whether the current image comprises a motion image region.

2. The method according to claim 1, wherein calculating the pixel luminance value is further based on exposure parameter values;
wherein, the exposure parameter values comprise a shutter speed corresponding to obtaining of the video image sequence, a gain value, and a reciprocal of an iris value of a lens.

3. The method according to claim 1, wherein obtaining the pixel motion detection value (P1) comprises:

obtaining an absolute value of a difference between the pixel value and the pixel average value, and obtaining a first intermediate value according to the absolute value and a preset threshold; and the first intermediate value to a preset value, and, in response to a result of the comparing, setting P1 to one of a first detection value and a second detection value.

4. The method according to claim 1, wherein obtaining the scene luminance motion detection value (P2) comprises:

obtaining an absolute value of a difference between the pixel luminance value and the average scene luminance value, and obtaining a second intermediate value according to the absolute value and a preset threshold; and the second intermediate value to a preset value, and in response to a result of the comparing, setting P2 to one of a third detection value and a fourth detection value.

5. The method according to claim 1, wherein obtaining the integrated motion detection value (P3) by integrating the P1 and P2 comprises:

determining an operating mode used to obtain the video image sequence, and obtaining weights corresponding to P1 and P2 according to the determined operating mode; and obtaining P3 according to a weighted P1 and a weighted P2 after weighting P1 and P2 according to the corresponding weights.

6. The method according to claim 1, wherein determining whether the image comprises a motion image region comprises:

comparing P3 to a motion detection value.

7. The method according to claim 1, further comprising, after determining whether the image comprises a motion image region, performing, by an image signal processor (ISP), demosaicing processing on the image.

8. The method according to claim 1, wherein the image is an image obtained after an image signal processor (ISP) performs black-level correction, lens shading correction, and pre-denoising processing on the video image sequence.

9. A non-transitory processor-readable medium having processor-executable instructions stored thereon for motion detection, the processor-executable instructions comprising instructions for:

obtaining a pixel value at a position of a current image to in a video image sequence, a pixel average value in a preset number of frame images before the current image corresponding to same position as the pixel value of the current image, and scene luminance values of the preset number of the frame images before the current image;

calculating a pixel luminance value based on the pixel value, and calculating an average scene luminance value based on the scene luminance values;

obtaining a pixel motion detection value (P1) based on the pixel value and the pixel average value, and obtaining a luminance motion detection value (P2) based on the pixel luminance value and the average scene luminance value; and obtaining an integrated motion detection value (P3) by integrating P1 and P2, and determining, based on P3, whether the current image comprises a motion image region.

10. The non-transitory processor-readable medium according to claim 9, wherein calculating the pixel luminance value is further based on exposure parameter values;

wherein, the exposure parameter values comprise a shutter speed corresponding to obtaining of the video image sequence, a gain value, and a reciprocal of an iris value of a lens.

11. The non-transitory processor-readable medium according to claim 9, wherein obtaining the pixel motion detection value (P1) comprises:

obtaining an absolute value of a difference between the pixel value and the pixel average value, and obtaining a first intermediate value according to the absolute value and a preset threshold; and comparing the first intermediate value to a preset value, and, in response to a result of the comparing, setting P1 to one of a first detection value and a second detection value.

12. The non-transitory processor-readable medium according to claim 9, wherein obtaining the scene luminance motion detection value (P2) comprises:

obtaining an absolute value of a difference between the pixel luminance value and the average scene luminance value, and obtaining a second intermediate value according to the absolute value and a preset threshold; and comparing the second intermediate value to a preset value, and in response to a result of the comparing, setting P2 to one of a third detection value and a fourth detection value.

13. The non-transitory processor-readable medium according to claim 9, wherein obtaining the integrated motion detection value (P3) by integrating the P1 and P2 comprises:

determining an operating mode used to obtain the video image sequence, and obtaining weights corresponding to P1 and P2 according to the determined operating mode; and obtaining P3 according to a weighted P1 and a weighted P2 after weighting P1 and P2 according to the corresponding weights.

14. The non-transitory processor-readable medium according to claim 9, wherein determining whether the image comprises a motion image region comprises:

comparing P3 to a motion detection value.

15. The non-transitory processor-readable medium according to claim 9, further comprising, after determining whether the image comprises a motion image region, performing, by an image signal processor (ISP), demosaicing processing on the image.

16. The non-transitory processor-readable medium according to claim 9, wherein the image is an image obtained after an image signal processor (ISP) performs black-level correction, lens shading correction, and pre-denoising processing on the video image sequence.

* * * * *